United States Patent [19]

Ellis, deceased

[11] 4,383,162

[45] May 10, 1983

[54] ELECTRICAL CONTROL CIRCUITS FOR FLASH WELDERS

[75] Inventor: Robert S. Ellis, deceased, late of Canfield, Ohio, by Virginia A. Ellis, executrix

[73] Assignee: Wean United, Inc., Pittsburgh, Pa.

[21] Appl. No.: 157,896

[22] Filed: Jun. 9, 1980

[51] Int. Cl.³ .............................................. B23K 11/04
[52] U.S. Cl. ...................................... 219/100; 219/97; 219/101; 219/104
[58] Field of Search ................. 219/97, 100, 101, 104, 219/108, 110

[56] References Cited

U.S. PATENT DOCUMENTS

| | | | |
|---|---|---|---|
| 3,681,563 | 8/1972 | Lifshits et al. | 219/97 |
| 3,980,857 | 9/1976 | Sciaky | 219/110 |
| 4,084,075 | 4/1978 | Deffenbaugh | 219/97 |
| 4,101,753 | 7/1978 | Buff et al. | 219/110 |

Primary Examiner—C. C. Shaw
Attorney, Agent, or Firm—Michael Williams

[57] ABSTRACT

An electrical control circuit which provides means of initiating the start of upset of a flash welding machine at an operator selectable value of flashing electrical energy. The energy signal for this circuit is taken from an energy monitor, such as the output of the circuit shown in U.S. Pat. No. 4,084,075. The control circuit, by means of a single adjustment of electrical switch means, may include a few additional electrical components to enable initiation of the start of upset, or termination of upset, as a function of platen position rather than as a function of flashing energy. Further, by simple adjustment of additional electrical switch means, further electrical components may be included to control the distance the movable platen moves during the upset portion of the welding cycle. Also, a meter may be included in the circuit to display either upset distance or upset initiation.

21 Claims, 6 Drawing Figures

FIG. 3.

ELECTRICAL CONTROL CIRCUITS FOR FLASH WELDERS

BACKGROUND AND SUMMARY

Generally a flash welder comprises a sturdy metal base on which are mounted a stationary platen and a moveable platen (as suggested in FIG. 1) the moveable platen being guided for sliding movement toward and away from the stationary platen.

Figures 1, 1A:
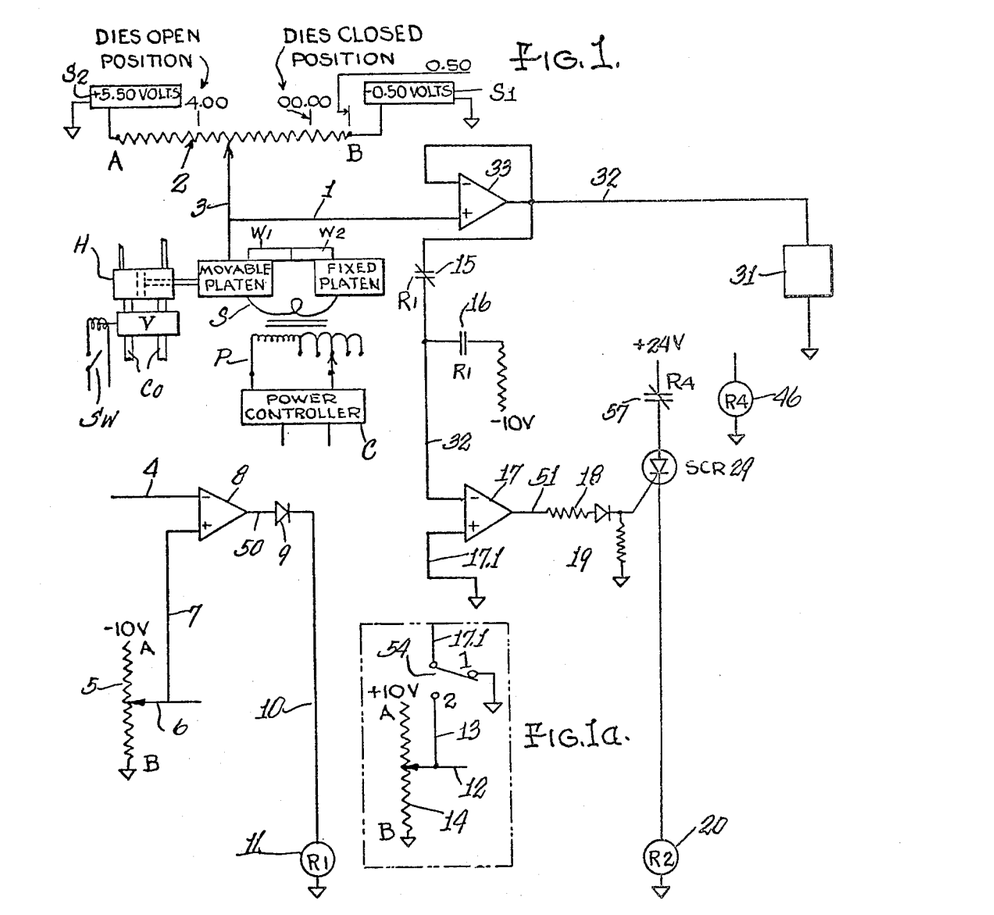

Each platen has a clamp thereon in which work pieces W1 and W2 are respectively clamped. The usual flash welder also includes a welding transformer having a primary P and a secondary S. The primary is connected to a power controller C which in turn is connected to a source of electrical energy. Opposite ends of the secondary are electrically connected to respective clamps.

The workpieces to be welded together are loaded into respective clamps so that adjoining ends are slightly spaced and the clamps are firmly engaged on the workpieces. The moveable platen is thereafter driven by a hydraulic cylinder H in a direction toward the moveable platen while transformer secondary current is caused to flow between the workpieces to cause an arcing or flashing between the workpieces. The arcing or flashing removes any irregularities between adjoining ends of the workpieces and causes a heating and softening of such ends.

After a predetermined amount of flashing, the forward movement of the moveable platen is increased materially (in some cases five to ten times the speed of flashing motion). This is termed the upset motion of the moveable platen and causes the heated workpiece surfaces to be forced together, thereby lowering electrical resistance between the workpieces and simultaneously increasing current flow (upset current) therebetween. This abrupt increase in motion may be effected by the flow of high pressure hydraulic fluid through larger conduits Co and to cylinder H. A solenoid controlled valve V may be interposed in the larger conduits to permit or prevent flow of upset fluid therebetween. Current to the coil of the solenoid of the valve is controlled by switch contacts Sw which are controlled in a manner to be described in connection with the description of the preferred embodiment of any invention.

My invention provides an electrical circuit which will initiate the start of upset of a flash welding machine at an operator-selectable value of flashing energy. This electrical circuit, by means of a simple adjustment of electrical switch means, may include a few additional electrical components to enable initiation of the start of upset, or termination of upset, as a function of platen position rather than as a function of flashing energy, thus providing the machine operator a choice of upset control.

Further, by simple adjustment of additional electrical switch means, further electrical components may be included to control the distance the moveable platen moves during the upset portion of the welding cycle independent of platen position at the start of upset. Also, a meter may be included in the circuit to display either upset distance or upset initiation position depending upon the setting of an electrical switch.

DESCRIPTION OF THE DRAWINGS

In the drawings accompanying this specification and forming a part of this application, there is shown, for purpose of illustration, an embodiment which my invention may assume, and in these drawings:

FIG. 1 is a diagram schematically illustrating certain components of a flash welder and an electrical circuit for control of certain functions of the flash welding cycle, FIGS. 1a and 1b disclose electrical components which may be selectively added to the circuit shown in FIG. 1, FIG. 2 is a further control circuit which may be added to that shown in FIG. 1, FIG. 2a discloses a slightly different circuit arrangement between parts of FIG. 2, and FIG. 3 discloses the circuit of FIG. 2 with further electrical components added.

DESCRIPTION OF THE PREFERRED EMBODIMENT

Our invention utilizes a potentiometer as part of the control to initiate the start of upset of a flash welding machine at an operator selectable value of flashing electrical energy. FIG. 1 illustrates the use of a linear potentiometer 2 with one of its relatively moveable parts, such as its slider 3, connected to move in unison with the moveable platen, although any more or less sophisticated means may be used to produce an electrical signal proportional to platen motion, such as a rotary potentiometer or a linear differential transformer.

At the present time, it is preferred to use a film-type potentiometer, and these are commercially available from many sources. The length of the potentiometer 2 in the illustrated embodiment is six inches (about 15 centimeters) and this length is usually ample since in most cases the full length of platen travel does not exceed six inches.

Source voltages are applied to the potentiometer and, in the embodiment disclosed, the algebraic sum of these voltages is equal in volts to the potentiometer's length in inches. The boxes electrically connected to respective ends of the resistor of the potentiometer are common plus and minus voltage supplies (such as Calex Model 22-100) which are in turn regulated by precision adjustable voltage regulators (not shown). The regulator for source "S1" may be a National semiconductor Model LM 304 and for source "S2" may be a NS Model LM 305. The voltage impressed on the forward or "die closed" end of the potentiometer (the right-hand end of FIG. 1) is made negative, and the retracted or "dies open" end of the potentiometer 2 (the left-hand end in FIG. 1) is made positive.

In the illustrated embodiment the algebraic difference of the voltages from sources "S1" and "S2" is six volts so that one volt equals one inch of length on the six-inch potentiometer. The magnitude of the negative voltage is chosen so that the slider voltage is zero before the "dies closed" position is reached. This is done so that the mechanical motion limit of the potentiometer slider 3 does not coicide with the "dies closed" position of the platen. This problem does not exist in the case of the "dies open" position since the potentiometer travel is chosen to be of greater length than the maximum platen motion. In the embodiment herein disclosed, source "S1" applies −0.50 volts to the right end of the potentiometer, and source "S2" applies +5.50 volts to the left end of the potentiometer, so that the algebraic difference is six volts. It will be noted that the 00.00 point on the potentiometer 2 (representing the "dies closed" position) is located one-half inch (12.70 millimeters) inward of the right-hand end of the potentiometer.

Signal 1 from the potentiometer slider 3 is fed to the noninverting input of an operational amplifier 33. The output signal 32 of amplifier 33 is connected to the input of a digital direct current volt meter 31. Since signal 1 has a scale of one volt per inch of platen movement and signal 32 is equal to signal 1, the meter indication is a measure of the platen position at any time relative to the platen "dies closed" position. The meter range is selected so that it can indicate the voltage corresponding to the platen maximum "dies open" position as the slider 3 moves toward potentiometer end A. The number of meter digits is selected to give the required resolution, and in the illustrated embodiment the meter has a range of 19.99 volts and, therefore, a measurement range of 19.99 inches and a resolution of 0.01 volts or 0.01 inches. The meter 31 may be a Weston Model 1230 and may be provided with a three-digit BCD (binary coded decimal) output and a "print command" signal. The BCD output and "print command" signal are not shown in FIG. 1 since they are not needed but they will be referred to in a later portion of this disclosure. In FIG. 1 the meter is shown as grounded.

The output 4 of an energy monitor (not shown) such as described in U.S. Pat. No. 4,084,075, issued to James F. Deffenbaugh (one of the inventors herein) on Apr. 11, 1978, and assigned to the same assignee as the present invention, is fed to the inverting input of an operational amplifier 8 which is electrically connected as a voltage comparator. The output 4 is a direct current voltage with a magnitude proportional to the electrical energy input to the welding machine, as described in said patent. In the embodiment disclosed herein the polarity of output 4 is negative and increases from zero as the flashing portion of the machine cycle progresses.

Potentiometer 5 shown in FIG. 1 is a precision type with a digital setting and readout arrangement. In the disclosed embodiment the range of potentiometer 5 is 9.99 volts with a resolution of 0.01 volts or 0.01 inches. The end "A" of potentiometer 5 is connected to a negative 10-volt source and end "B" is connected to ground. Signal 7, therefore, is a negative voltage whose magnitude is proportional to the position of the slider 6 with respect to end "B." With a setting of 4.00, for example, signal 7 has a value of negative 4.00 volts and is fed to the noninverting input of comparator amplifier 8.

Since the energy monitor output 4 starts at a value of zero, output 50 of comparator amplifier 8 is negative and the diode 9 is reversed biased and keeps relay 11 deenergized. As the flashing signal progresses, the energy signal 4 increases in a negative direction until it just exceeds the value of signal 7, whereupon the output 50 of the comparator amplifier 8 switches to positive and forward biases diode 9 to cause energization of relay 11.

During the flashing portion of the machine cycle, slider 3 of the potentiometer 2 is moving toward end "B" which is the "dies closed" position of the moveable platen. Signals 1 and 32 and therefore decreasing toward zero from the more positive value they had at the beginning of the flashing cycle. As seen in FIG. 1 signal 32 is connected to contacts 15 and 16 of relay 11. The noninverting input 17.1 of comparator amplifier 17 is at ground potential, and its inverting input 32 is at some positive potential above ground until relay 11 is energized.

In this condition, that is prior to energization of the relay 11, the output 51 of comparator amplifier 17 is negative to thus reverse bias diode 19 through resistor 18. The resistor 18 is used to reduce the leakage gate current of SCR 29 from maintaining relay 20 energized when a contact of a relay to be described is opened later in the machine sequence.

When the relay 11 is energized, as above described, normally-closed contact 15 is opened and removes signal 32 from the inverting input of comparator amplifier 17, and contact 16 is closed to connect a negative 10-volt source to the inverting input. When the relay contacts 15 and 16 are thus operated, the negative 10-volt source that is now fed to the inverting input of comparator amplifier 17 causes the output 51 to change to positive to forward bias diode 19 and fire SCR 29, thus initiating upset motion at a selected value of flashing energy.

The condition path of SCR 29 is from a positive source of 24 volts through closed contact 57 of a relay 46, to relay 20 and then to ground. SCR 29 is used as a clamped source for relay 20 since SCR 29 cannot be deenergized unless contact 57 is opened. Therefore, a momentary loss of signal from comparator 17 due to noise will not open relay 20. Energization of relay 20 initiates the upset means, such as the solenoid heretofore described to close switch contacts Sw and thus increase the velocity of motion of the moveable platen toward the "dies closed" position.

Figure 1B:
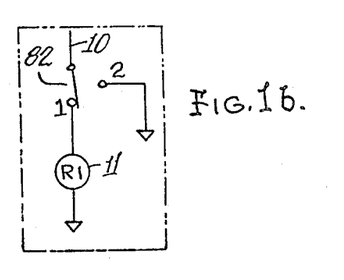

If it is desired to initiate upset motion as a function of platen position, the components shown in FIGS. 1a and 1b are added to the circuit shown in FIG. 1. The addition of the components in FIG. 1a will result in inserting a switch 54 in the line 17.1. In the "1" position of the switch, the line 17.1 will be connected to ground, as it is in FIG. 1. In the "2" position of switch 54 the line is connected to the output 13 of a slider 12 of a potentiometer 14, the latter having its end "A" connected to a positive 10-volt source. The addition of the components in FIG. 1b will result in inserting a switch 82 in the line 10, between the diode 9 and relay 11. In the "1" position of the switch 82, the signal in line 10 goes through relay 11 to ground, as in FIG. 1. In the "2" position of switch 82, the relay is removed from the circuit and line 10 is connected directly to ground.

To initiate upset motion as a function of platen position, the above-noted switches 82 and 54 are both set to their "2" positions. In such position switch 82 deactivates relay 11 and switch 54 energizes the comparator amplifier from the slider 12 of potentiometer 14.

When signal 32 (FIG. 1) from the amplifier 33, and in turn connected to the inverting input of comparator 17, becomes slightly less than signal 13 from slider 12 which is connected to the noninverting input of comparator 17, the output of the latter becomes positive and forward biases diode 19 and in turn fires SCR 29, thereby initiating upset motion. The initiation position is determined by the setting of the slider 12 of potentiometer 14. For example, if the setting of slider 12 were 4.00, upset would be initiated when the platen was at a position 4.00 inches from the "dies closed" position.

Figures 2, 2A:
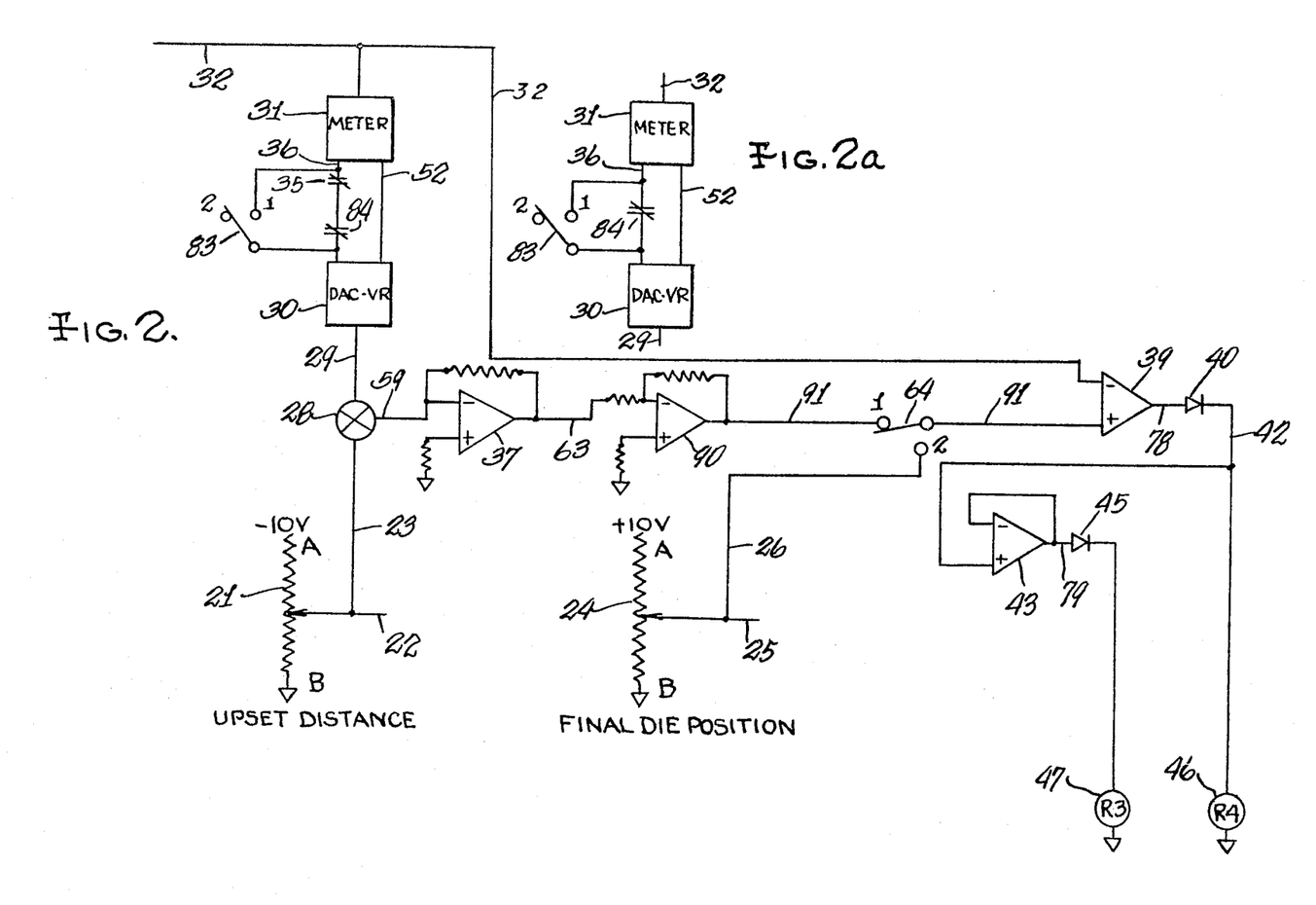

The systems just described may be combined with further electrical components to control the distance of upset, and attention is directed to FIG. 2 which discloses such further components.

As before referred to, the meter 31 may be provided with a three-digit BCD (binary coded decimal) output identified by the reference numeral 52 in FIG. 2, and also may have a "print command" signal 36. The signal 32, heretofore referred to, is connected to the input of meter 31. The meter 31 may be an A-D converter but the particular type of meter disclosed is preferred because it has a readout to show the state of the digital output at the end of each conversion, and thus shows the position of the moveable platen at any time.

Since the input of meter 31 is signal 32, and since contact 35 of relay 11 was closed prior to the energization of relay 11 and the start of upset, the "print signal" 36 from the meter 31 maintains conversion operation of a digital to analog convertor DAC-VR 30. This converter has a self-contained storage register and a three-digit BCD (binary coded decimal) and may be a Datel Model DAC-VR.

With the output 52 of meter 31 connected to the BCD input of converter 30 and contact 35 closed, the analog output of the converter 30 is fed to a summing junction 28 of a unity gain inverting summing amplifier 37.

A potentiometer 21, which is identical to potentiometer 5, is connected to a negative 10-volt source. The signal 23 from slider 22 is connected to the summing junction 28 of operational amplifier 37.

The purpose of potentiometer 21 is to provide an adjustable signal 23 that can be used to control the distance that the moveable platen moves during the upset movement of the welding machine cycle. Mention is made of the fact that the upset motion of the moveable platen may be terminated at a selectable position relative to the "dies closed" position by means of a potentiometer 24. This is the normal operating mode if the start of upset motion is initiated as a function of the flashing energy signal from the energy monitor. However, it will be evident that termination of the upset motion at a fixed position will result in the changes in the total upset motion if the energy level signal reaches the set operating point of amplifier 8 (shown in FIG. 1) at different positions of the moveable platen during the flashing cycle.

In the operation of the circuit to control upset distance, the output 59 from the summing junction 28 is fed to the inverting input of the operational amplifier 37, and this output 59 is equal to the algebraic sum of the signals 29 and 23. Signal 23 is dependent upon the position of the slider 22 relative to the ends "A" and "B" of the potentiometer 21. As an example, it may be assumed that the setting of the slider 22 is 0.50. This will produce a negative 0.50 volt signal in line 23 and would be equal to a platen motion distance of 0.50 inches.

Signal 1 (of the circuit shown in FIG. 1) is numerically equal to the position of the platen relative to the "dies closed" position, and since signal 29 tracks signal 1, the output of summing junction 28 is a positive signal equal to whatever the value of signal 1 or 29 would be if the position of the platen were 0.50 inches closer to the "dies closed" position than it actually is. When relay 11 is energized to initiate upset motion, contact 35 of relay 11 is opened. This prevents further conversion of converter 30 and clamps signal 29 at the value it had at the start of upset motion. Output 29 of the summing junction 28 is (under the assumed set of circumstances) now 0.50 volts less than signals 1 or 29 were at the start of upset motion. If it is assumed that the start of upset motion occurred at a platen position of 1.50 inches from the "dies closed" position, signal 29 would have a value of 1.50 volts positive and the output 59 of summing junction 28 would be 1.50−0.50 or 1.00 volts positive.

Signal 59 which (under the foregoing assumed facts) has a value of 1.00 volt positive is fed to the inverting input of inverting unity gain summing amplifier 37, and the output 63 of the latter has an equal but inverted value. Signal 63 is fed to the inverting input of unity gain inverting amplifier 90 to bring its output signal 91 back to the same polarity and value as signal 59. Since switch 64 is in its "1" position, signal 91 is fed to the noninverting input of comparator amplifier 39. Signal 32, which at this time has the assumed value of 1.50 volts positive, is connected to the inverting input of amplifier 39. Since signal 32 is greater than signal 91 the output 78 of amplifier 39 is negative, diode 40 is reverse-biased and relay 46 is deenergized.

As upset motion progresses, the slider 3 (see FIG. 1) moves toward the end "B" of potentiometer 2, and signals 1 and 32 therefore decrease. When the value of signal 32 becomes slightly less than signal 91 from amplifier 90 (or 1.00 volt in the assumed example) output 78 of amplifier 39 becomes positive to thus forward bias diode 40 and energize relay 46. When relay 46 is energized, its contact 57 (see FIG. 1) opens to thereby deenergize SCR 29 and relay 20.

Deenergization of relay 20 operates well-known logic circuits of a flash welding machine to terminate upset motion. Output 42 of amplifier 39 is also connected to the noninverting input of follower amplifier 43. When the signal 42 from amplifier 39 becomes positive at the end of upset motion, output 79 of follower amplifier 43 also becomes positive and thereby forward biases the diode 45 and energizes relay 47. Energization of relay 47 switches other well-known logic circuits of the welding machine to assist in the termination of upset motion. Thus, in the assumed example, upset motion of the welding machine was stopped after the moveable platen traveled a distance equal to 0.50 inches, as commanded by the setting of the potentiometer 21.

Figure 3:
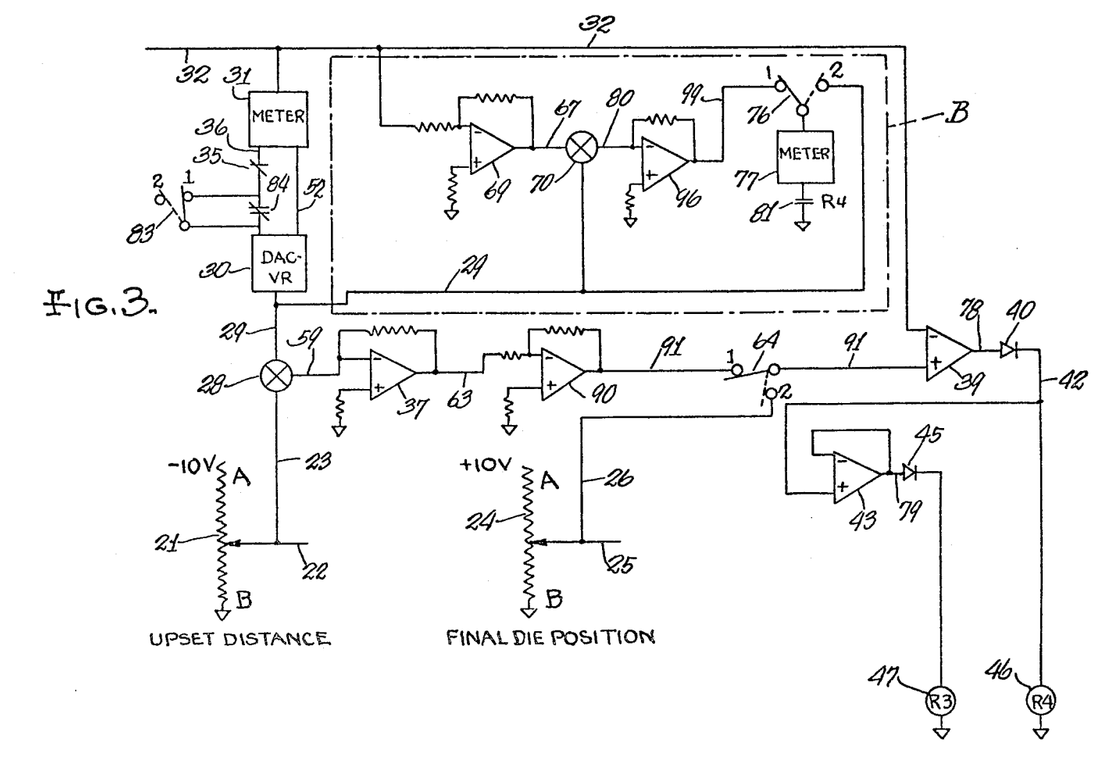

The foregoing circuitry may also be adapted, by addition of further components, to provide a digital readout in inches (or millimeters if the proper scaling is used) of either the platen position at which upset motion was started, or the magnitude of upset motion. Attention is directed to FIG. 3 wherein such additional circuit components are located in the rectangular box B shown in dot-dash lines, in combination with the circuit shown in FIG. 2 which, it should be remembered, is combined with the circuit shown in FIG. 1.

In operation the signal 29 from the output of DAV-VR 30, with contact 35 closed, is a positive voltage which is numerically equal, either in inches or millimeters depending on the scaling used, to the distance of the moveable platen relative to the "dies closed" position. As seen in FIG. 3, signal 29 is fed to one input of a summing junction 70.

Signal 32 from the operational amplifier 33 (FIG. 1) in addition to being fed to the meter 31, is also fed to the inverting input of unity gain inverting amplifier 69 and the negative inverted output 67 of the latter is connected to the other input of the summing junction 70. Since signal 67 from amplifier 69 is equal to signal 29, but of opposite polarity, output 80 of the summing junction 70 is zero. With switch 76 at the "1" position, input to meter 77 is also zero. The meter 77 may be the same as meter 31 (FIG. 2) except that no BCD output is required; the "print command" signal is not used; and the polarity sign is blanked. Signal 80 from the summing junction 70 remains at zero as the moveable platen moves toward its "dies closed" position.

When contact 35 of relay 11 (FIGS. 1 and 2) is opened at the start of upset motion, the output signal 29 from DAC-VR 30 is clamped at the value it had at that instant. As the moveable platen moves through the upset distance negative signal 67 (the output from amplifier 69) decreases and the output 80 of the summing junction 70 becomes positive with a value equal to the algebraic sum of signals 29 and 67. Signal 80 is fed to the inverting input of unity gain inverting summing amplifier 96. This condition continues as the platen moves toward "dies closed" position, with the output of amplifier 96 becoming larger until the upset motion is terminated by operation of relays 46 and 47 in a manner hereinbefore described. Signal 32 and output 67 are no longer changing and output signal 99 from amplifier 96 is now numerically equal to the distance the platen moved during upset.

With switch 76 set to its "1" position, signal 99 is fed to meter 77 and the latter displays a digital number equal to the dimension of the upset movement. Contact 81 of relay 46 closes with energization of the latter and clamps meter 77 so that it retains its display until the start of the next welding cycle. If it is desired to display the position at which upset motion is initiated, switch 76 is set to its "2" position. This connects signal 29 to the input of the meter 77 and, since signal 29 is clamped at upset initiation, the meter will display the position of the platen at which upset motion was initiated.

If it is desired to control upset distance, regardless of platen position, when upset motion has been initiated by platen position (switch 54 set at 2 and switch 82 set at 2), switch 83 is set to position 2. Energization of relay 20 at upset initiation opens contact 84 and activates the clamping system of DAC-VR 30 exactly as previously described, resulting in an upset distance equal to the setting of the slider 22 of potentiometer 21. The display of meter 77 will also indicate either upset distance or upset initiation position, depending on the setting of switch 76.

If it is desired to terminate the upset motion as a function of platen position, switch 64 is set to its "2" position. This feeds signal 26 from slider 25 of potentiometer 24 to the noninverting input of comparator 39 whose action is exactly the same as previously described for signal 91 input to amplifier 39. Since the operation of potentiometer 24 is exactly the same as potentiometer 14, the setting of potentiometer 24 is numerically equal to platen position.

With switch 64 set in its position "2", switch 83 may be set at either position "1" or "2". At position "1" the meter 77 may be set to read platen position by setting switch 76 to its "2" position. With switch 83 set to its "2" position, the meter may be set to read either upset distance or position of upset initiation by means of switch 76, as previously described for flashing energy initiation of upset.

FIG. 2a illustrates a slightly different circuit arrangement between the meter 31 and the converter, wherein the contact 35 is omitted. If this is done, the description should be read to specify contact 84 for contact 35 and relay 20 for relay 11.

It is claimed:

1. In a flash welder having relatively movable platens which carry the work pieces to be welded, said platens moving relatively through flashing and upset operations toward closed position, the improved method of initiating the start of upset operation of said platens at an operator-selectable value of flashing electrical energy, comprising:

adjusting the magnitude of a voltage from a voltage source to an operator-selectable value to block operation of a switch-controlling device until an energy signal representing electrical energy input to said welder, said energy signal derived from voltage and current input to said welder, during flashing operation has reached a value to counteract said adjusted voltage and effect operation of said switch-controlling device, and utilizing the operation of said switch-controlling device to energize a circuit which includes means for initiating the start of upset operation of said platens.

2. In a flash welder having relatively movable platens which carry the workpieces to be welded, said platens moving relatively through flashing and upset operations toward closed position, the improved method of initiating the start of upset operation of said platens at an operator-selectable value of flashing electrical energy, comprising:

feeding an energy signal to one input of an operational amplifier, said energy signal derived from voltage and current input to said welder during flashing operation and progressively changing as said platens move toward closed position, feeding a voltage to the other input of said operational amplifier, feeding the output signal of said operational amplifier to a diode which controls energization of a relay having contacts, adjusting said voltage to an operator-selectable value to bias said diode to a condition to prevent energization of said relay until said energy signal reaches a value to counteract said adjusted voltage and bias said diode to a condition to energize said relay and operate relay contacts, and utilizing operation of said relay contacts to energize an electrical circuit which includes means for initiating the start of upset operation of said platens.

3. In a flash welder having relatively movable platens which carry the workpieces to be welded, said platens moving relatively through flashing and upset operations toward closed position, the improved method of initiating the start of upset operation of said platens at an operator-selectable value of flashing electrical energy, comprising:

feeding an energy signal of negative polarity to the inverting input of a first operational amplifier, said energy signal derived from voltage and current input to said welder during flashing operation and progressively increasing as said platens move toward closed position, feeding a voltage of negative polarity to the noninverting input of said first operational amplifier, feeding the output signal from said first operational amplifier to a diode which controls energization of a relay having contacts, adjusting said voltage to an operator-selectable value to reverse bias said diode and prevent energization of said relay until said energy signal increases to exceed the value of the adjusted voltage and thereby forward bias said diode and energize said relay and operate the contacts of the latter, feeding a signal of positive polarity to the inverting input of a second operational amplifier, the output of the latter being connected to a second diode which is reverse biased by this signal, and utilizing the operation of said relay contacts to remove the positive polarity signal from said inverting input of said second operational amplifier and replace it with a signal of negative polarity to thereby forward bias said second diode and energize a circuit which includes means for initiating the start of upset operation of said platens.

4. In a flash welder having relatively movable platens which carry the work pieces to be welded, said platens moving relatively through flashing and upset operations toward closed position, the improved method of initiating the start of upset operation of said platens at an operator-selectable value of flashing electrical energy, comprising:

applying a first signal to an operational amplifier, said first signal derived from voltage and current input to said welder, changing the magnitude of said first signal in accordance with the increasing voltage and current input to said welder during flashing operation, applying a second signal to said operational amplifier, said second signal being operator-adjustable to a magnitude corresponding to the magnitude of said first signal at any selected point in the movement of said platens toward closed position, said first and second signals being of the same kind and when the magnitude of said first signal exceeds that of said second signal said operational amplifier provides for energization of an electrical circuit including components for initiating the start of upset motion of said platens.

5. The method according to claim 4 wherein said first signal is negative and is applied to the inverting input of said operational amplifier and wherein said first signal increases in a negative direction as flashing progresses, and wherein said second signal is derived from a negative source and is applied to the noninverting input of said operational amplifier, and further including the step of applying the output of said operational amplifier to a diode which controls energization of a relay having contacts, wherein while said second signal exceeds the magnitude of said first signal the output of said operational amplifier is negative to reverse bias said diode and prevent energization of said relay, and wherein when said first signal exceeds the magnitude of said second signal, the output of said operational amplifier is positive to forward bias said diode and effect energization of said relay and activation of said relay contacts and utilizing the actuation of said relay contacts to energize said electrical circuit.

6. The method according to claim 4 wherein said operational amplifier provides for energization of a relay and consequent actuation of the contacts of said relay, and wherein said electrical circuit includes a second operational amplifier, and further including the step of applying a third voltage to said second operational amplifier, said third voltage being effective to block initiation of the start of upset motion, and utilizing the actuation of said relay contacts to replace said third voltage with a fourth voltage applied to said second operational amplifier, said fourth voltage being effective to provide for initiation of the start of upset motion.

7. In a flash welder having relatively movable platens which carry the work pieces to be welded, said platens moving relatively through flashing and upset operations toward closed position, the improved method of initiating the start of upset operation of said platens at an operator-selectable value of flashing electrical energy, comprising:

applying a first voltage of negative polarity to the inverting input of an operational amplifier and increasing said first voltage in a negative direction as flashing progresses, applying a second voltage derived from a negative source to the noninverting input of said operational amplifier, said second voltage being operator-adjustable to a magnitude corresponding to the magnitude of said first voltage at any selected point in the movement of said platens toward closed position, applying the output of said operational amplifier to a diode which controls energization of a relay having contacts, wherein when said second voltage exceeds the magnitude of said first voltage, the output of said operational amplifier is of negative polarity to reverse bias said diode and prevent energization of said relay, and when said first voltage exceeds the magnitude of said second voltage, the output of said operational amplifier is of a positive polarity to forward bias said diode and effect energization of said relay and actuation of said relay contacts, applying a third voltage to the inverting input of a second operational amplifier, applying the output of said second operational amplifier to a second diode which is adapted to control conduction of a silicon-controlled rectifier, the latter controlling initiation of the start of upset motion, said third voltage being of positive polarity so that the output of said second operational amplifier reverse biases said second diode and prevents conduction of said silicon-controlled rectifier, and utilizing the actuation of said relay contacts to replace said third voltage with a fourth voltage applied from a source of negative polarity to said inverting input of said second operational amplifier whereby the output of said second operational amplifier forward biases said second diode to trigger said silicon-controlled rectifier into conduction and effect initiation of the start of upset motion of said platens.

8. The method according to claim 7 wherein said third voltage is applied across the resistance of a potentiometer and including the step of moving the slider of said potentiometer in unison with the relative movement of said platens and in a manner so that the voltage on said slider varies in decreasing manner as said platens more toward closed position, applying the variable third voltage on said slider to the inverting input of said second operational amplifier and connecting the noninverting input of said second operational amplifier to ground, the further improvement wherein, by operator choice, circuit subcomponents may be switched into the circuit at the option of the operator to remove said relay from operation and to selectively switch the noninverting input of said second operational amplifier from ground to the slider of a second potentiometer, and applying a fifth voltage from a source of positive polarity across the resistance of said second potentiometer whereby a fifth voltage of a selected magnitude may be applied to said noninverting input and effect conduction of said second diode when the magnitude of said fifth voltage exceeds the magnitude of said third voltage, and thereby initiate the start of upset motion of said platens as a function of platen position.

9. In a flash welder having relatively movable platens which carry the work pieces to be welded, said platens moving relatively through flashing and upset operations toward closed position, an improved control circuit for initiating the start of upset operations of said platens at an operator-selectable value of flashing electrical energy, comprising:

an energy monitor connected to said flash welder and providing an output signal which is derived from voltage and current input to said welder, an operational amplifier, having one input connected to said energy monitor output signal, a source of voltage independent of the voltage of said energy monitor, a potentiometer connected to said source so that the voltage therefrom is applied across the resistance of the potentiometer, the slider of the potentiometer being movable along said resistance to vary the voltage of said source to a magnitude selected by said operator, the variable voltage from said slider being connected to the other input of said operational amplifier, and means effected by the output of said operational amplifier to control initiation of the start of upset operation.

10. The control circuit according to claim 9, and further including a diode electrically connected to the output of said operational amplifier, conduction of said diode being controlled by the relative values of said energy monitor signal and the operator-selected voltage from said separate source, a relay energized by conduction of said diode to effect operation of the contents of said relay, and a circuit energized by operation of said relay contacts to initiate the start of upset operation of said platens.

11. The control circuit according to claim 10 wherein said last-named circuit includes a second operational amplifier, a further source of voltage connected to an input of said second operational amplifier when said relay contacts are operated by energization of said relay, a second diode electrically connected to the output of said second operational amplifier and conducting when said further source of voltage is connected to the input of said second operational amplifier, and a silicon-controlled rectifier triggered into conduction by conduction of said second diode to effect initiation of the start of upset motion of said platen.

12. The control circuit according to claim 11 and further including a second potentiometer with another source of voltage applied across its resistance, the slider of said second potentiometer being connected to a moveable one of said platens to provide a voltage which decreases in value as the platens move toward closed position, the voltage from slider being connected to said input of said second operational amplifier to block conduction of said second diode, the other input of said second operational amplifier being connected to ground, first switch means operable to electrically remove said relay and electrically connect the first-named diode to ground, and second switch means operable to remove said other input of said second operational amplifier from ground and electrically connect such input to the slider of a third potentiometer adapted to apply a voltage of a magnitude selected by said operator to said other input of said second operational amplifier to thereby provide for initiation of the start of upset motion of said platens as a function of platen position.

13. In a flash welder having fixed and moveable platens which carry the workpieces to be welded, said moveable platen being moveable toward closed position with respect to said fixed platen through flashing and upset operations, the improved method of controlling the amount of upset motion of said moveable platen to a machine operator selectable amount, comprising, applying a voltage from a first source across the resistance of a first potentiometer, moving the slider of said first potentiometer in unison with movement of said moveable platen so that the voltage on said slider varies in decreasing manner as the moveable platen moves toward closed position, feeding the variable voltage on said slider to a sample-hold conversion unit and feeding the output of said unit to one terminal of a summing junction, applying a voltage from a second source across the resistance of a second potentiometer, the slider of which is moveable by the machine operator so that voltage on said slider has an adjusted value in selected proportion to the amount of desired platen movement, feeding the adjusted voltage on said slider of said second potentiometer to the other terminal of said summing junction so that the output of the latter is the algebraic sum of said variable voltage and said adjusted voltage, interrupting conversion of said sample-hold unit at the time of initiation of upset motion of said moveable platen to fix the voltage at the output of said conversion unit to the value at the initiation of upset motion, feeding the voltage so fixed to one input of an operational amplifier, also feeding said variable voltage on the slider of said first potentiometer to the other input of said operational amplifier, the latter comparing the two voltages fed to its two inputs and causing its output to actuate controls for interruption of upset motion of said moveable platen when said two voltages reach a predetermined relative value.

14. In a flash welder having fixed and moveable platens which carry the workpieces to be welded, said moveable platen being moveable toward closed position with respect to said fixed platen through flashing and upset operations, the improved method of controlling the amount of upset motion of said moveable platen to a machine operator selectable amount, comprising, applying a voltage of positive polarity across the resistance of a first potentiometer, moving the slider of said first potentiometer in unison with movement of said moveable platen so that the voltage on said slider varies in positive polarity in a decreasing manner as the moveable platen moves toward closed position, feeding the variable voltage on said slider to a sample-hold conversion unit and feeding the output of said unit to one terminal of a summing junction, applying a voltage of negative polarity across the resistance of a second potentiometer, the slider of which is moveable by the machine operator so that the negative voltage on said slider has an adjusted numerical value in proportion to the amount of desired platen movement, feeding the adjusted voltage on said slider of said second potentiometer to the other terminal of said summing junction so that the output of the latter is the algebraic sum of the output of said conversion unit and said adjusted voltage, interrupting conversion of said sample-hold unit at the time of initiation of upset movement of said moveable platen to fix the output of said unit to said summing junction to the value established at the initiation of upset motion, and thereby fix the algebraic sum of the output of said conversion unit and the machine-operator-adjusted voltage from said second potentiometer to a predetermined value, feeding the algebraic sum so fixed to the noninverting input of an operational amplifier, also feeding said variable positive voltage on said slider of said first potentiometer to the inverting input of said amplifier, feeding the output of said amplifier to the input of a diode which is adapted to energize a relay when said diode is forward biased, said diode remaining reverse biased until said variable voltage applied to the inverting input of said amplifier becomes less than said fixed algebraic sum, whereupon said diode is forward biased to energize said relay and effect operation of a circuit to interrupt upset motion of said moveable platen.

15. The method according to claim 14 and further including switching means selectively operable by the machine operator to either one of two positions, in one position the circuit operating as specified, and in another position disconnecting said fixed algebraic sum from the noninverting input of said operational amplifier and in place connecting voltage on a slider of a third potentiometer, the resistance of the latter having voltage of positive polarity applied thereacross, said slider of said third potentiometer being adjusted by said machine operator to a value which will forward bias said diode when the value of said variable voltage applied to the inverting input of said amplifier becomes less than said adjusted value, to thereby energize said relay and interrupt upset motion of said moveable platen.

16. In a flash welder having fixed and moveable platens which carry the workpieces to be welded, said moveable platen being moveable toward closed position with respect to said fixed platen through flashing and upset operations, an improved circuit for controlling the amount of upset motion of said moveable platen to a machine operator selectable amount, comprising, a first potentiometer having a voltage of positive polarity applied across its resistance, said potentiometer having a slider which is moveable in unison with movement of said moveable platen to vary said voltage in a progressively decreasing positive polarity as said moveable platen moves toward closed position, a meter having a binary coded decimal output and a print command signal, said output and said signal being electrically connected to the input of a digital to analog converter, the input of said meter being connected to receive the variable voltage signal from the slider of said first potentiometer, and the analog output of said converter tracking said variable signal, a summing junction having one of its inputs connected to said analog converter to receive its analog output, a second potentiometer having a voltage of negative polarity applied across its resistance, and having a slider connected to the other input of said summing junction, said slider being adjustable by the operator of the welding machine to a selected position along the resistance of said second potentiometer to provide a variable voltage signal, said summing junction having an output representing the algebraic difference between said analog output and the variable voltage signal from the slider of said second potentiometer, an operational amplifier, having a noninverting input receiving the output of said summing junction and an inverting input receiving the variable voltage signal from the slider of said first potentiometer, said amplifier also having an output, a diode having its input connected to receive the output of said amplifier, and having an output, a relay coil connected to the output of said diode and energized when said diode is forward biased, and a switch adapted to be operated at the time of initiation of the start of upset motion of said moveable platen to prevent further conversion of said digital analog converter and to clamp the output thereof at the value it had at the start of upset motion, whereby when the voltage on the slider of said first potentiometer decreases to a value less than the output of said summing junction, the output of said operational amplifier will forward bias said diode and energize said relay coil, and contacts affected by energization of said relay coil to halt movement of said moveable platen toward closed position, thereby to control upset movement of said moveable platen in accordance with the setting of the slider of said second potentiometer.

17. The control circuit according to claim 16 and further including switching means selectively operable by the machine operator to either one of two positions, in one position the circuit operating as specified and in the other position disconnecting the output of said summing junction from the non-inverting input of said operational amplifier and in place connecting voltage on a slider of a third potentiometer, the resistance of the latter having a voltage of positive polarity applied thereacross, said slider of said third potentiometer being adjusted by said machine operator to a value which will forward bias said diode when the value of the voltage applied to the inverting input of said amplifier becomes less than the voltage from the slider of said third potentiometer, to thereby energize coil and effect operation of said contacts to control final position of said moveable platen.

18. In a flash welder having fixed and moveable platens which carry the workpieces to be welded, said moveable platen being moveable toward closed position with respect to said fixed platen through flashing and upset operations, the improved method of providing a reading of the magnitude of upset motion, comprising, applying a voltage across the resistance of a potentiometer, moving the slider of said potentiometer in unison with movement of said moveable platen so that voltage on said slider varies in a progressive manner as the moveable platen moves toward closed position, feeding the variable voltage on said slider to the input of a sample-hold conversion unit and also to the inverting input of an operational amplifier, feeding the output of said conversion unit to one terminal of a summing junction, feeding the output of said amplifier to the other input of said summing junction, the output of said summing junction representing the algebraic difference between the output of said conversion unit and the voltage signal from the slider of said potentiometer, feeding the output of said summing junction to a voltage meter having a digital readout, the voltage signal from said conversion unit tracking and being equal to and of the same polarity with respect to the voltage signal from the slider of said first potentiometer during conversion operation of said sample-hold unit, whereby the output of said summing junction and the input to said meter are zero, interrupting conversion of said conversion unit at the time of initiation of upset movement of said moveable platen to clamp the output of said unit and to said summing junction to a value established at the initiation of upset motion, while the voltage signal from the slider of said potentiometer continued to progressively vary so that the output of said summing junction represents a progressively varying algebraic difference between the clamped output and the progressively varying voltage to effect progressive readout on said meter, and interrupting upset movement of said moveable platen at a predetermined time to thereby clamp the voltage from the slider of said potentiometer and halt further input to said meter.

19. The method according to claim 18 and further including switching means selectively operable by the machine operator to one of two positions, in one position the circuit operating as specified, and in the other position disconnecting the output of said summing junction from said digital meter and instead connecting the output of said conversion unit to said meter, whereby the readout of said meter will display the position of the moveable platen at the time the output of said conversion unit is clamped.

20. In a flash welder having fixed and moveable platens which carry the workpieces to be welded, said moveable platen being moveable toward closed position with respect to said fixed platen through flashing and upset operations, the improvement for providing a readout of the magnitude of upset motion of said movable platen, comprising, a potentiometer having a voltage applied across its resistance, the slider of said potentiometer being moveable in unison with movement of said moveable platen to vary voltage on the slider in a progressive manner as said moveable platen moves toward closed position, a sample-hold conversion unit and an operational amplifier, and means connecting the voltage from said slider to the input of said sample-hold unit and to the inverting input of said amplifier, a summing junction, and means connecting the output of said sample-hold unit to one terminal of said summing junction and the output of said amplifier to the other terminal of said summing junction, the latter having an output representing the algebraic difference between the output of said sample-hold unit and the voltage from the slider of said potentiometer, a voltage meter having a digital readout, and means feeding said output of said summing junction to said meter, the output voltage of said sample-hold unit tracking but being of opposite polarity than the voltage from said slider of said potentiometer, whereby the output of said summing junction and the input to said meter are zero, means interrupting conversion of said sample-hold unit at the time of initiation of upset movement of said movable platen to clamp the output of said unit and to said summing junction at a value established at the initiation of upset motion, while the voltage from the slider of said potentiometer varies, so that the output of said summing junction progressively varies to effect a progressively varying reading on said meter, and means interrupting upset movement of said movable platen at a predetermined time to thereby clamp the voltage from said slider of said potentiometer and thereby halt further input to said meter.

21. In a flash welder having relatively movable platens which carry the workpieces to be welded, said platens moving relatively through flashing and upset operations toward closed position, the improved method of initiating the start of upset operation of said platens and thereafter controlling the amount of upset motion thereof to a machine operator selectable amount, comprising, adjusting the magnitude of a voltage from a first voltage source to an operator-selectable value to block operation of a switch-controlling device until an energy signal representing electrical energy input to said welder during flashing operation has reached a value to counteract said adjusted voltage and effect operation of said switch-controlling device, utilizing the operation of said switch-controlling device to energize a circuit which includes means for initiating the start of upset operation of said platens, applying a voltage from a second source across the resistance of a first potentiometer, moving the slider of said first potentiometer in unison with movement of said movable platen so that the voltage on said slider varies in decreasing manner as the movable platen moves toward closed position, feeding the variable voltage on said slider to a sample-hold conversion unit and feeding the output of said unit to one terminal of a summing junction, applying a voltage from a third source across the resistance of a second potentiometer, the slider of which is movable by the machine operator so that voltage on said slider has an adjusted value in selected proportion to the amount of desired platen movement, feeding the adjusted voltage on said slider of said second potentiometer to the other terminal of said summing junction so that the output of the latter is the algebraic sum of said variable voltage and said adjusted voltage, interrupting conversion of said sample-hold unit at the time of initiation of upset motion of said movable platen to fix the voltage at the output of said conversion unit to the value at the initiation of upset motion, feeding the voltage so fixed to one input of an operational amplifier, also feeding said variable voltage on the slider of said first potentiometer to the other input of said operational amplifier, the latter comparing the two voltages fed to its two inputs and causing its output to actuate controls for interruption of upset motion of said movable platen when said two voltages reach a predetermined relative value.

* * * * *

UNITED STATES PATENT OFFICE
CERTIFICATE OF CORRECTION

PATENT NO. : 4,383,162
DATED : May 10, 1983
INVENTOR(S) : James F. Deffenbaugh and Robert S. Ellis, deceased It is certified that error appears in the above-identified patent and that said Letters Patent are hereby corrected as shown below:

On the title page, Item [75] Inventor: should read:

-- [75] Inventors: Robert S. Ellis, deceased, late of Canfield, Ohio, by Virginia A. Ellis, Executrix and James F. Deffenbaugh, Warren, Ohio --.

Signed and Sealed this

Twenty-sixth Day of July 1983.

[SEAL]

Attest:

GERALD J. MOSSINGHOFF

Attesting Officer

Commissioner of Patents and Trademarks